US008326684B1

(12) United States Patent
Halahmi et al.

(10) Patent No.: US 8,326,684 B1
(45) Date of Patent: Dec. 4, 2012

(54) SYSTEM AND METHOD FOR SELECTIVE PUBLICATION OF SPONSORED COMMENTS

(76) Inventors: Eyal Halahmi, Kfar Netter (IL); Eitan Ron, Ra'anana (IL); Tal Goldberg, Even Yehuda (IL); Philippe Lang, White Plains, NY (US)

( * ) Notice: Subject to any disclaimer, the term of this patent is extended or adjusted under 35 U.S.C. 154(b) by 436 days.

(21) Appl. No.: 12/724,779

(22) Filed: Mar. 16, 2010

Related U.S. Application Data (60) Provisional application No. 61/160,649, filed on Mar. 16, 2009.

(51) Int. Cl.
*G06Q 30/00* (2006.01)
(52) U.S. Cl. .................. 705/14.4; 705/14.49; 705/14.51; 705/14.73
(58) Field of Classification Search .................. 705/14.4, 705/14.49, 14.51, 14.73
See application file for complete search history.

(56) References Cited

U.S. PATENT DOCUMENTS

| | | | |
|---|---|---|---|
| 7,370,285 B1* | 5/2008 | Nickerson et al. ............. 715/808 |
| 7,693,898 B2* | 4/2010 | Fish ............................. 707/708 |
| 8,032,528 B2* | 10/2011 | Donovan et al. ............... 707/736 |
| 8,065,193 B2* | 11/2011 | Bullock ......................... 705/26.3 |
| 8,073,915 B1* | 12/2011 | Nandy .......................... 709/206 |
| 8,103,553 B2* | 1/2012 | Bullock ........................ 705/26.1 |
| 8,180,829 B2* | 5/2012 | Arav ............................. 709/204 |
| 2004/0049534 A1* | 3/2004 | Nickerson et al. ............. 709/203 |
| 2004/0205065 A1* | 10/2004 | Petras et al. ....................... 707/5 |
| 2005/0125725 A1* | 6/2005 | Gatt ............................... 715/517 |
| 2006/0224444 A1* | 10/2006 | Koningstein et al. ........... 705/14 |
| 2007/0016477 A1* | 1/2007 | Yang et al. ...................... 705/14 |
| 2007/0043617 A1* | 2/2007 | Stein et al. ...................... 705/14 |
| 2007/0118435 A1* | 5/2007 | Ran ................................ 705/26 |
| 2007/0118735 A1* | 5/2007 | Cherrington et al. .......... 713/155 |
| 2007/0121843 A1* | 5/2007 | Atazky et al. ............. 379/114.13 |
| 2007/0130014 A1* | 6/2007 | Altberg et al. .................. 705/14 |
| 2007/0179968 A1* | 8/2007 | Fish .............................. 707/102 |
| 2007/0208614 A1* | 9/2007 | Arnett et al. .................... 705/10 |
| 2007/0220056 A1* | 9/2007 | Arora ............................ 707/200 |
| 2008/0028023 A1* | 1/2008 | Locke ........................... 709/203 |
| 2008/0033781 A1* | 2/2008 | Peretti ............................ 705/10 |
| 2008/0065649 A1* | 3/2008 | Smiler ........................... 707/10 |
| 2008/0141132 A1* | 6/2008 | Tsai ............................... 715/716 |
| 2008/0147487 A1* | 6/2008 | Hirshberg ....................... 705/10 |
| 2008/0154698 A1* | 6/2008 | Flake et al. ..................... 705/10 |
| 2008/0177752 A1* | 7/2008 | Kulkarni et al. ................ 707/10 |
| 2008/0215589 A1* | 9/2008 | Elhaik ............................ 707/10 |
| 2008/0250035 A1* | 10/2008 | Smith et al. ................... 707/100 |
| 2008/0301002 A1* | 12/2008 | Chokov et al. ................. 705/26 |
| 2009/0037257 A1* | 2/2009 | Stuckey et al. ................ 705/10 |

(Continued)

*Primary Examiner* — Gregory Johnson
(74) *Attorney, Agent, or Firm* — Leason Ellis LLP (57) ABSTRACT

A system for publishing a sponsor-comment together with content of a publisher that is associated with a particular file. A code segment is included in the particular file. A database relates a plurality of keywords with one or more sponsors. A registration module is operative to register one or more channels of the publisher, each said channel including at least one of the plurality of files. A communication module is operative to receive a sponsor-comment across the network. A comment management module is operative to selectively associate the sponsor-comment with the particular file in accordance with at least one criterion accessible to one or more of the servers. Upon opening each respective file in a browser of a client machine, the code segment executes to cause the browser to include in the display the sponsor-comment together with the publisher-content. Variations of systems and methods that publish sponsor comments are disclosed.

21 Claims, 8 Drawing Sheets

U.S. PATENT DOCUMENTS

| | | | |
|---|---|---|---|
| 2009/0144133 A1* | 6/2009 | Cha et al. | 705/10 |
| 2009/0249223 A1* | 10/2009 | Barsook et al. | 715/753 |
| 2009/0287682 A1* | 11/2009 | Fujioka et al. | 707/5 |
| 2010/0023615 A1* | 1/2010 | Grigsby et al. | 709/224 |
| 2010/0162093 A1* | 6/2010 | Cierniak | 715/205 |
| 2010/0223119 A1* | 9/2010 | Klish | 705/14.26 |
| 2010/0241968 A1* | 9/2010 | Tarara et al. | 715/751 |
| 2010/0250370 A1* | 9/2010 | Jones et al. | 705/14.66 |
| 2011/0028211 A1* | 2/2011 | Shiga et al. | 463/30 |
| 2011/0202606 A1* | 8/2011 | Agarwal et al. | 709/206 |

\* cited by examiner

Peanut product recalls spread fast

Updated 3h 36m ago | Comments 55 | Recommend 12    E-mail | Save | Print | Reprints & Permissions | RSS By Julie Schmit and Elizabeth Weise, USA TODAY Mixx it
Other ways to share:
Yahoo! Buzz
Digg
Newsvine
Reddit
Facebook The economic wallop from a salmonella outbreak in peanut products continues to spread with more than 800 recalls and more expected this week.

The recall, one of the largest ever, started with bulk peanut butter, spread to crackers and cookies and has engulfed products as diverse as kettle corn, pad Thai and trail mix.

Whole Foods (WFMI), for one, has removed more than 80 products from its stores, its website says. Anecdotal evidence indicates that sales of all peanut-related products, even unaffected peanut butters, are slipping, says Robert Brackett, senior vice president of the Grocery Manufacturers Association, a food industry trade group.

"All it takes is a little company, and it has a huge ripple effect," he says.

LATEST RECALL INFO: From the U.S. Food and Drug Administration

The Department of Justice on Friday joined in the investigation of Peanut Corp. of America, raising the possibility of criminal charges. PCA's Blakely, Ga., plant has been linked to a salmonella outbreak that's sickened 529 and may have contributed to eight deaths. For every reported illness, dozens go unreported.

FIND MORE STORIES IN: United States | Justice Department | Food and Drug Administration | Thailand | Peter Pan | Safeway | Unilever | Peanut Corp | Grocery Manufacturers Association | ConAgra Foods | Robert Brackett | Skippy | Georgia Peanut Commission The GMA says PCA supplied less than 1% of peanut products sold in the U.S. Still, the FDA says the company has more than 300 customers, many of whom used PCA's products as an ingredient. "A pound of their product ends up in 100 pounds of other products," says John Sniffen of Orchard Valley Harvest, which last week recalled peanuts packed for Safeway.

PCA expanded its recall last week to two years' worth of production and added peanuts, peanut meal and other products to the peanut butter and paste recall.    210    212

Kar salted almonds are an excellent substitute to peanuts. High in magnesium and vitamin E, it is the perfect high energy snack. Learn more...    214

Major peanut butter brands are not affected. Producers such as Unilever (UN), maker of Skippy, and ConAgra Foods (CAG), which sells Peter Pan, have told consumers as much on their websites.

The FDA said Friday that some boutique peanut butters, made from peanuts ground in stores, may be affected because of the wider recall.

Figure 2A

The recall's breadth has the $1 billion peanut farming industry on edge, says Emory Murphy, assistant executive director of the Georgia Peanut Commission. "This could affect demand," he says.

Brackett fears consumers will tire of checking recall lists and begin shunning anything with peanuts. Past food scares have shown that to be true.

The FDA says it's detected salmonella at the PCA plant and that in 2007 and 2008, the company shipped product that had tested positive for salmonella after a retest came up negative. PCA says it disagrees with some of the FDA's inspection findings.

Add a Sponsored Comment — 250      220      212

Sponsored Comment

All peanuts sold in WalMart stores are produced in Virginia. Our peanuts are not affected by this recall. They are perfectly safe for consumption and delicious. Learn more...    214

Sponsored Comment by Planters Peanuts. We are NOT recalling any products in connection with this article. We have NEVER purchase peanut products from the PCA Blakely, GA, plant. Our highest priority is the safety of our consumers. All our peanut products including dry roasted peanut, honey roasted and peanut butter are perfectly safe. Learn more...    214

More Sponsored Comments »    230      212

Share this story:
Mixx it    Yahoo! Buzz    Digg    Newsvine    Reddit    Facebook Posted 14h 9m ago
Updated 3h 38m ago                               E-mail | Save | Print | Reprints & Permissions | RSS To report corrections and clarifications, contact Reader Editor Brent Jones. For publication consideration in the newspaper, send comments to letters@usatoday.com. Include name, phone number, city and state for verification. To view our corrections, go to corrections.usatoday.com.

Guidelines: You share in the USA TODAY community, so please keep your comments smart and civil. Don't attack other readers personally, and keep your language decent. Use the "Report Abuse" button to make a difference. Read more.

You must be logged in to leave a comment. Log in | Register

Comments: (55)  Showing: Newest first ▼ retiring_soon wrote: 7h ago
IN CHINA THE COMPANY PERSONNEL RESPONSIBLE WOULD BE EXECUTED... They did this to make money... time to follow China's lead... same with Madoff etc etc. public executions.

Recommend | Report Abuse

Figure 2B

The Mouse Reinvented, By Apple

Posted by Alexander Vaughn on: October 20th, 2009, 12.30 pm

The most interesting of today's Apple line update news is probably the introduction of the "Magic Mouse". The new mouse, which is included with every new iMac or can be purchased on its own for $69, will allow desktop Mac users to finally enjoy multitouch. Apple's idea was basically to put a touchpad on a mouse, add bluetooth to it and you're set. [ Content continues...]

Sponsored Comments  240  214

The deaf community is aware of the impact of RSI (repetitive stress injury) on users of sign language, a gesture based communication. As an ergonomic expert, I unfortunately expect similar injuries with the gesture technology used in the new Apple mouse. The Smartfish Ergomotion Mouse uses a pivot technology that allows your hand to move in a natural wave-like motion. This dramatically improves the comfort when using a computer. Learn more at SmartfishTechmologies.com 250
Click here to add your Sponsored Comment now 2 Comments Tony: October 20, 2009 • 1:33 pm
Looks like another great product...that costs a bit.

Mr. Big Apple: October 20, 2009 • 4:29 pm
Kind of feels like a step backwards. I use all 4 buttons on my current Apple mouse, so I would really miss the two extra buttons. Also that finger swiping doesn't look that natural feeling.

Leave a Response

Advertisements, links and other web contentnt

Figure 2C

Sponsored Comments

The current outbreak of flu virus is not of pig origin. According to the CDC, H1N1 "is not transmitted by food, and you cannot get this flu from eating pork. Pork meat is safe to eat and as always delicious. A message from the National Pork Producers Council. Learn more...

Sponsored Comments

*This space is reserved for Sponsored Comments about this article.*

Click here to add a Sponsored Comment

SYSTEM AND METHOD FOR SELECTIVE PUBLICATION OF SPONSORED COMMENTS

CROSS-REFERENCE TO RELATED APPLICATIONS

The present application claims the benefit of U.S. Provisional Patent Application Ser. No. 61/160,649, filed Mar. 16, 2009, entitled "System and Method for Providing Sponsored Comments," which is hereby incorporated by reference in its entirety.

FIELD OF THE INVENTION

The present invention concerns publishing over a network and, more particularly, the present invention concerns systems and methods for contextual commenting in response to real-time analysis of network-accessible content, with any sponsor comments being clearly identified as such in comment sections that are allocated within websites, blogs and other network-delivered information sources.

BACKGROUND OF THE INVENTION

Over the past decade, the Internet has rapidly become an important source of information for individuals and businesses. The popularity of the Internet as an information source is due, in part, to the vast amount of available information that can be downloaded by almost anyone having access to a computer and a modem. Moreover, the Internet is especially conducive to conduct electronic commerce, and has already proven to provide substantial benefits to both businesses and consumers.

Many web services have been developed through which vendors can advertise and sell products directly to potential clients who access their websites. Additionally, many news outlets presently present most, if not all, of their content on the Internet. Individuals also present information on the Internet on web pages or blogs. Many of these sources allow users or viewers to post comments anonymously or after signing in.

Conventionally, the process of adding comments has been open to anyone. As negative posts are made regarding an institution, the institutions only recourse is posting in reply a positive response either named or anonymously. However, anonymity in posting positive comments can result in unintended complications. Consider for example, the actions of Reverb Communications in August of 2009. This public relations firm represented dozens of game publishers and developers at that time and found itself in an embarrassing situation. The firm, as a service to its clients, had promised rave reviews from "game users." To deliver, it hired interns who trawled iTunes and other community forums looking for opportunities to post positive reviews of client games. However, the backlash to Reverb's "astroturfing" was severe. Word spread through the blogosphere, discrediting both the firm and its clients. It's safe to say that more people read about Reverb's illicit tactics than had actually read its planted reviews.

The problem that Reverb appears to have not appreciated in time is that "astroturfing" violates a fundamental principle of the Internet: Information democracy. People respect and value the opinions of their peers, so much so that they place as much credence on user-generated content as they do on messages crafted by marketers or other experts. In fact, consumers have demanded—and received—numerous forums for sharing their personal experiences with virtually every product or service on the market. To most consumers, "astroturfing" threatens the legitimacy of the Internet. The American government concurs. In October 2009, the Federal Trade Commission introduced new rules requiring bloggers and gadget review sites, among others, to disclose to readers whether they've been compensated to review a product. Failure to do so results in a $11,000 fine.

Conventional on-line marketing and advertising techniques are often limited in their ability to provide contextually relevant material for different types of web pages such as comment fields related to news articles and the like. One reason for this is because conventional techniques typically rely upon non-real time analysis of web page content by third party public relations firms to make determinations as to which online material should be responded to with respect to an institution's image. However, marketers are extremely interested in engaging consumers in the places on the Web where products are discussed, experiences are shared, and opinions are formed. After all, they have a lot at stake in those conversations.

Accordingly, it will be appreciated that there exists a need for improving online contextual commenting techniques in order to utilize real-time analysis of web and offset the negative impact of anonymous posting. In part, the present invention addresses this problem by providing marketers and industry participants with an opportunity to engage in the dialogs that occur in the readers' comments sections of news sites and blogs in an above-board way with sponsor comments clearly identified as such.

SUMMARY OF THE INVENTION

In accordance with one aspect of the invention, a system is connected to a network for publishing a sponsor-comment on a display together with content of a publisher that is associated with a particular file. The system comprises one or more servers each having a processor. A code segment is included in each of a plurality of files. A database is configured to relate a plurality of keywords with one or more sponsors. A plurality of modules executes in one or more of the processors. There is a registration module that is operative to register one or more channels of the publisher, each channel including at least one of the plurality of files. There is a keyword alert Module that is operative to monitor the publisher-content in the registered channels so as to identify a keyword in the files of the registered channels. There is a message construction module that is configured to respond to the keyword alert module with a message that is constructed so as to include the identified keyword and at least identify the publisher-content associated with the particular file. There is a communication module that is operative to provide the message to the one or more sponsors and to receive the sponsor-comment across the network. There is a comment management module that is operative to selectively associate the sponsor-comment with the particular file in accordance with at least one criterion accessible to one or more of the servers. Upon opening each respective file, the code segment executes via a browser on a client machine to cause the browser to include in the display the sponsor-comment together with the publisher-content.

In a separate aspect of the invention, a system is again connected to a network for publishing a sponsor-comment on a display together with content of a publisher that is associated with a particular file. In this system, there are one or more servers each having a processor, a code segment included in each of a plurality of files, and a database configured to relate a plurality of keywords with one or more sponsors, as described above. In this system, there is also a plurality of modules executing in one or more of the processors. Among the modules, there is a registration module that is operative to register one or more channels of the publisher, each said channel including at least one of the plurality of files. There is a communication module that is operative to receive a sponsor-comment across the network. There is also a comment management module that is operative to selectively associate the sponsor-comment with the particular file in accordance with at least one criterion accessible to one or more of the servers. Upon opening each respective file, the code segment executes via a browser on a client machine to cause the browser to include in the display the sponsor-comment together with the publisher-content.

In still another aspect of the invention, a publishing method for publishing across a network onto a browser of a client machine has a sponsor-comment published together with content of a publisher that is associated with a particular file. The method calls for providing one or more servers each having a processor. The method calls for including a code segment in each of a plurality of files. The method calls for configuring a database to relate a plurality of keywords with one or more sponsors. The method executes a plurality of modules in one or more of the processors. The modules according to this aspect of the invention include a set of modules such as those described in the previous paragraphs. The method also calls for executing the code segment upon opening each respective file using the browser, thereby causing the browser to publish the sponsor-comment together with the publisher-content.

These and other features, aspects and advantages of the invention can be appreciated from the following Description of Certain Embodiments of the Invention and the accompanying Drawing Figures.

DESCRIPTION OF THE DRAWING FIGURES

FIG. 2A illustrates a first portion of a web page constructed in accordance with one aspect of the invention;

DETAILED DESCRIPTION OF CERTAIN EMBODIMENTS OF THE INVENTION

By way of overview and introduction, the present invention is described in detail in connection with a sponsored comment being included in a webpage as one specific implementation of a system and method in accordance with the invention. In the same implementation, multiple sponsor-comments can be presented, and their respective positions can be determined automatically by a system using at least one programmed criterion. As will be understood, sponsor-comments can be presented in other environments in which content is dynamically constructed in response to a request for information, and the present discussion in the context of a web browser is just one non-limiting example of how the invention can be implemented.

By including sponsor-comments together with publisher-content, a sponsor can directly target an audience with its viewpoint which can promote an understanding of issues, commerce, or some other purpose.

Figure 1:
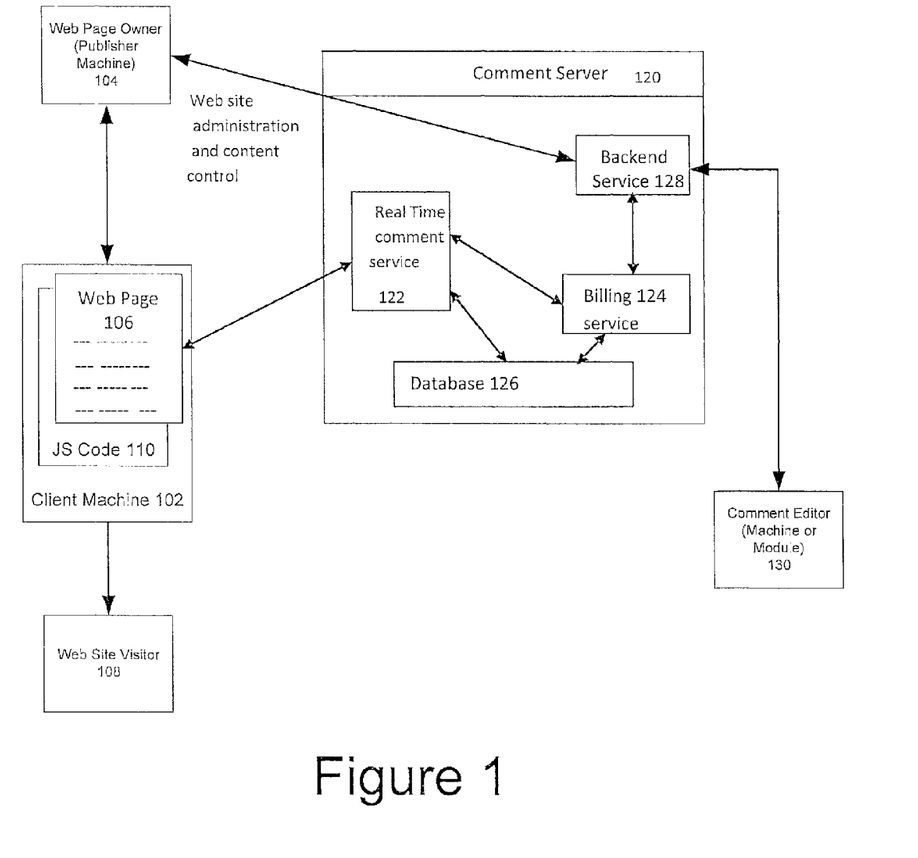
FIG. 1 is a block diagram of a system arrangement suitable for practicing the invention in accordance with one embodiment thereof.

Referring now to FIG. 1, a system arrangement 100 includes several machines or modules (as indicated) that are represented by blocks. The machines connect to one another over a network such as the Internet or any distributed network (not shown). In particular, a client machine 102 connects to a publisher machine 104 over the network as indicated by the connecting arrow. In a conventional manner, the publisher machine 104 delivers a file such as an HTML-compatible file that opens in a web browser running on the visitor's machine 102. In this case, the file is a web page 106 that can be viewed by the visitor 108, such as using Internet Explorer or Mozilla, two notoriously well known web browser programs. If the visitor were using some other software with browser functionality (the ability to open, interpret, and display content), the file can be in a different format.

In accordance with a broad aspect of the invention, the particular file 106 that the visitor has called up in his browser includes a code segment 110 that executes locally (that is, at the client machine 102) and causes one or more sponsor-comments to be presented together with the publisher content from the publisher machine 104. The code segment differs from conventional inline-frame and ad-server calls in that it is configured to identify the content in the file and the publisher and provide that information to a dedicated comment server 120, described next. Files that are displayed in a browser in accordance with the invention all have the code segment 110 that executes upon opening the file on the client machine.

The comment server 120 selectively provides to the client machine comments made using a comment editor 130 for presentation with the publisher content in the web page 106. The criterion or criteria that govern whether a comment is to be displayed is specified, in part, by the publisher and, in part, by the sponsor, as will be described below. The comment editor 130 can be a module executing at the comment server 120 or elsewhere, or can be a dedicated machine connected over the network as indicated by the connecting arrow. The comment server 120 has several functional blocks that cooperate to provide the functionality described herein. These blocks execute on a processor of the server 120 as code or instructions. In a particular implementation, the server 120 can include one or more servers, each having a processor. For instance, there can be a front-end web server, an application server, and a database server. Briefly, there is a comment service 122 that executes in real time to respond to any requests for files of publishers that have registered with the service. There is a billing service 124 that manages revenue obligations of the sponsors that seek to benefit from the comment service. There is a database 126 that stores information suitable for implementing the comment service and billing sponsors for the publication of sponsor-comments. And there is a backend service 128 that is used by both publishers and sponsors to establish each respective criterion that is to be used in connection with content of the publisher on the one hand and comments by a sponsor on the other hand.

Figure 1A:
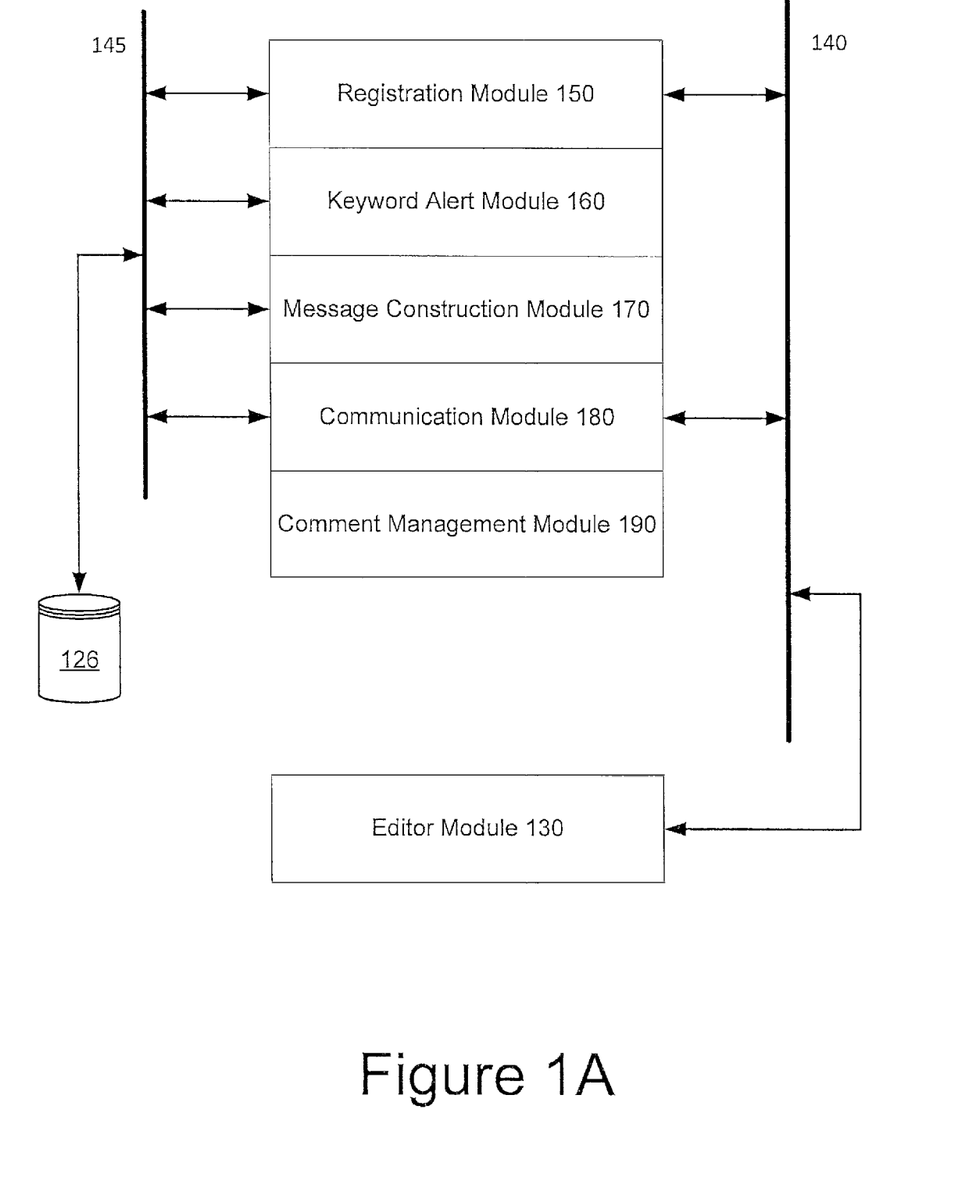
FIG. 1A is a schematic diagram showing a set of modules configured and communicatively connected to implement the invention such as in accordance with the arrangement of FIG. 1.

Turning now to FIG. 1A, the network across which sponsor-comments are created and later received at client machines 102, and across which publisher-content is distributed is indicated by bus 140. Meanwhile, the database 126 communicates with a set of modules that each execute in the processors of the server 120 (or plural servers) and are collectively configured to implement the invention such as in accordance with the arrangement of FIG. 1 over a data bus 145. Each of the modules is discussed in turn.

The registration module 150 manages registration of a sponsor interested in posting a comment for publication. General registration includes capture of contact information, billing information, and the like. In relevant part, the registration module 150 is further configured to prompt the sponsor or otherwise capture from the sponsor a selection of one or more keywords, which selection is stored in the database 126 in relation to the sponsor. The registration module also captures the parameters for alerting the sponsor. In this regard, the sponsor can identify particular publishers such as specific newspapers, blogs, or other content providers, and can include tests on the content such as frequency of the keyword in the content so as to construct a rule to its satisfaction.

The registration module also manages registration of a publisher interested in earning revenue from the inclusion of sponsor-comments with its content. The publisher can establish as a setting in a configuration file associated with the publisher whether, for example, a particular channel can accommodate a sponsor-comment in view of whether there already are one or more sponsor comments on that page, or whether there is any other constraint that the publisher imposes on that channel. The prevailing paradigm is preferably defined in the configuration file, and different paradigms can co-exist for different channels and also for different publishers, with all settings usable by the comment server in determining (as discussed below) whether to send an alert. The registration module also can be configured to enable the publisher to define the payment model that is to apply. Exemplary payment models include a per-word, per-time or per-impression basis, as understood by those of skill in the art.

Figure 2B:
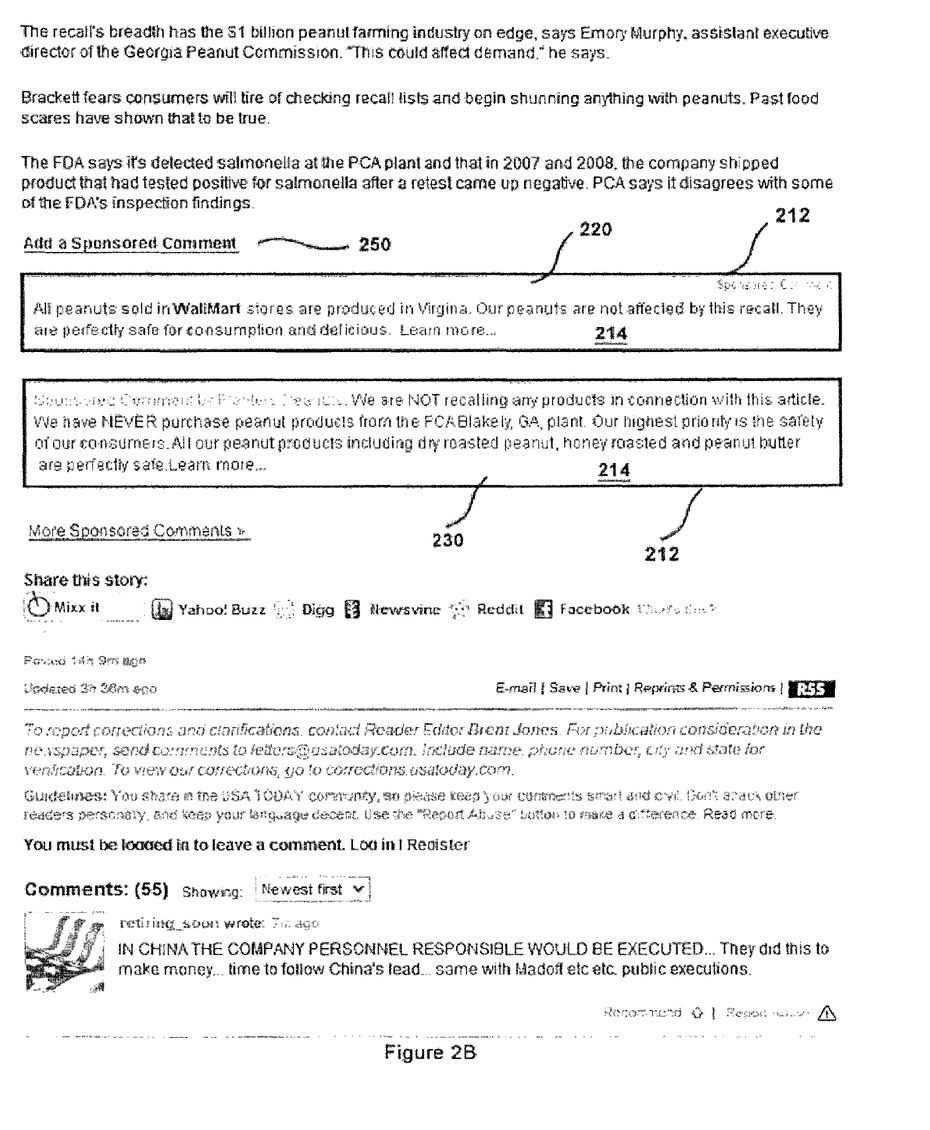
FIG. 2B illustrates a further portion of the web page of FIG. 2A.
Figure 2C:
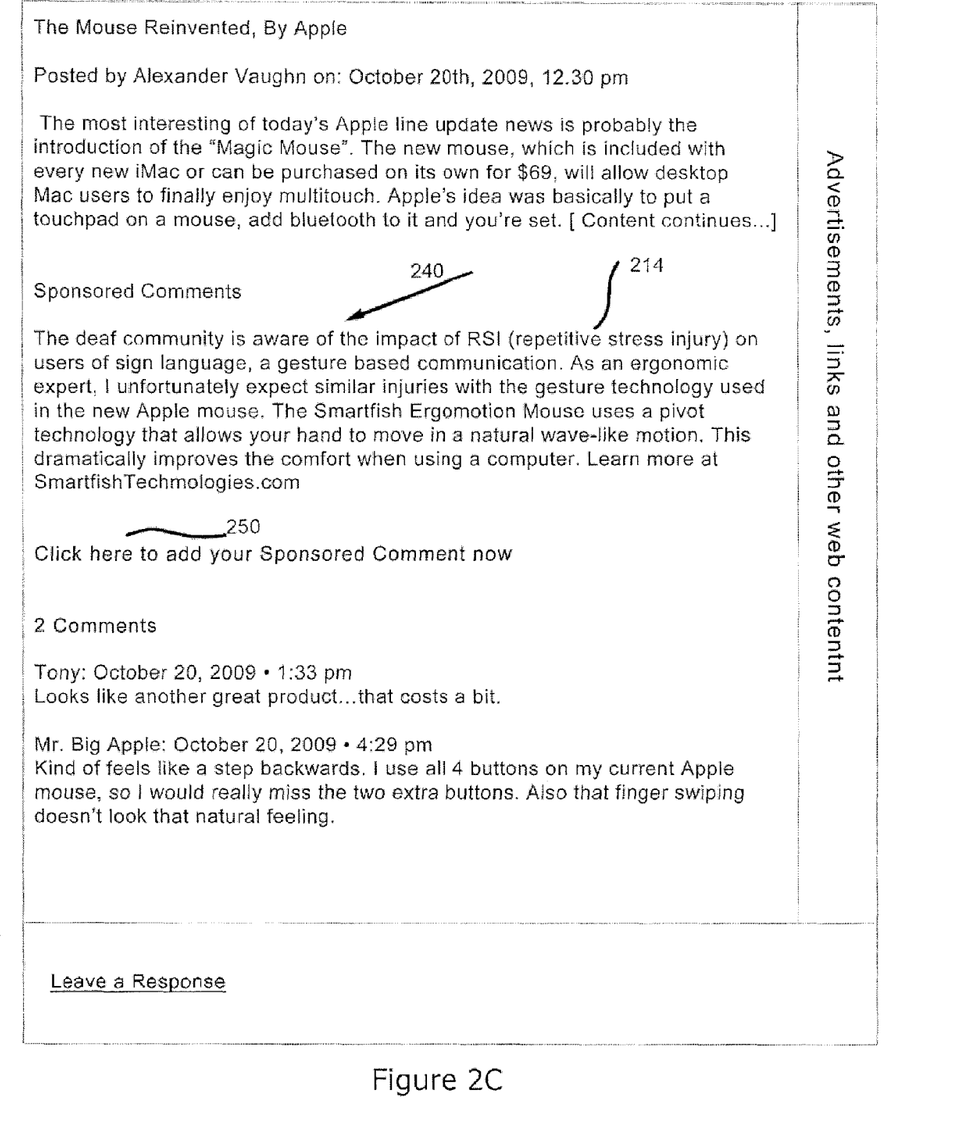
FIG. 2C illustrates a portion of a web page constructed in accordance with another aspect of the invention.
Figure 2D:
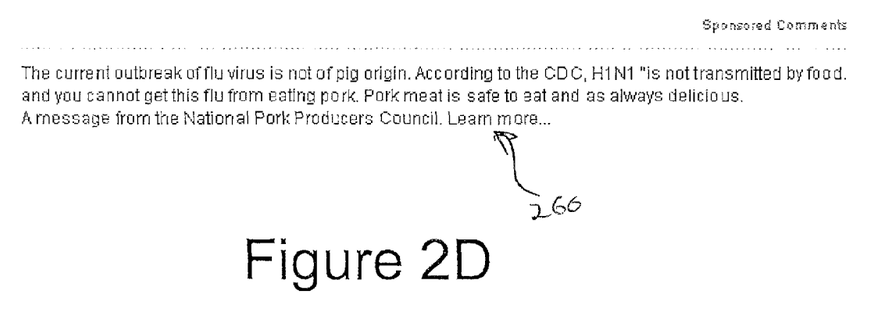
FIG. 2D is an example of a sponsor-comment showing demarcation around it.
Figure 2E:
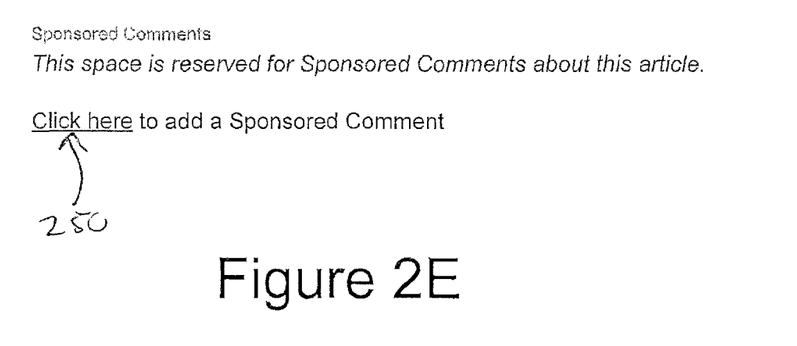
FIG. 2E is an example of a place holder presented with publisher-content in the absence of any sponsor-comments.

A publisher, after completing general registration as described above for sponsors, as well as establishing any parameters that are to govern whether a particular sponsor can have a comment included in a given channel, downloads the code segment 110 which operates as a functional widget to present sponsor-comments when criteria are met (see FIGS. 2A through 2D) and to display a default message when criteria are not met (see FIG. 2E). The code segment 110 can be a Javascript routine that is included in the body of a particular file, or group of files. Alternatively, the routine can be a Java, Applet, ActiveX, AJAX, i-frame or other construct suitable for requesting or pulling in content from a remote server such as the comment server. The publisher includes the code segment in each file that it determines, in its sole discretion, is permitted to receive sponsor-comments.

The publisher-content that can include sponsor-comments can be considered channels open to sponsor-input, and, typically, feedback from visitors which takes the form of comments too, yet which comments are demarcated separately from any sponsor-comments. A channel can comprise one file or a group of files. For instance, all files (e.g., web pages) in the product review section of a newspaper can be in one channel, whereas a topic-specific blog can have one file that is its own channel Regardless of the number of files in a channel, the code segment 110 in each file that can accept sponsor-comments can look like the following:

```
<!-- start TalkAhead code -->
<script type='text/javascript'>
if (typeof TH_position == 'undefined'){
    TH_position=0;
    TH_articles = new Array( );
} else {
    TH_position++;
}
document.write("<div id='TH_div_"+TH_position+"'></div>");
    TH_articles[TH_position] = {
        article: '[unique number here]',
        title: '',
        publisher: '[publisher id here]',
        category: 'default channel',
        url: document.location,
        load: function( ) {
            headID = document.getElementsByTagName("head")[0];
            newScript = document.createElement('script');
            newScript.type ='text/javascript';
            newScript.src = 'http://server.talkahead.com/scripts/thwidget/th.js';
            headID.appendChild(newScript);
        }
    };
if (TH_position==0){
    TH_articles[TH_position].load( );
}
</script>
<!-- end TalkAhead code -->
```

The publisher includes this code segment 110 in each such file, and establishes criteria to be satisfied in order to display a particular sponsor-comment together with the publisher-content. In other words, the code segment is configured to identify to the comment server 120 the particular file that has been pulled into a client machine 102, so that the comment server can determine, dynamically, whether any sponsor satisfies criteria to have its sponsor-comment loaded and presented together with the publisher-content. The publisher criteria can be that the sponsor meets a minimum payment requirement, or that the publisher have pre-approved the text of a sponsor-comment, or that the comment not include a link to a further site, or that the sponsor have participated in a larger media-buying program, and so on, including any combination of these requirements. The publisher criteria can be copied or modified for use in connection with multiple channels and keywords.

Thus, the registration module permits the publisher to register one or more channels, each including at least one file, by including the code segment 110 therein. The keyword alert module 160 monitors the publisher-content in the registered channels either in response to a visitor loading the file at the client machine 102, or by monitoring the file at the publisher machine 104 for changes. The monitoring is to identify the presence of a keyword in the files of any of the registered channels. The keyword identification can be using a conventional indexer which parses the text of the file and identifies matches in the database 126. Preferably, the monitoring is in real time.

If the keyword alert module 160 identifies the presence of a keyword in the files of any registered channel, the message construction module 170 has code configured to respond to this event by constructing a message that includes the identified keyword and at least the identity of the publisher-content in the file that matches the sponsor's criterion or criteria. Optionally, the message can include the actual publisher content from the file for review by the sponsor so that a comment can be created (using the editor module 130, discussed below). Alternatively, yet optionally, the message can include a link to the file associated with the publisher-content.

The message so-constructed is communicated over the network 140 using the communication module 180, which module can provide conventional communication services to the other modules that make up the comment server 120. Communications can be using any conventional protocol, such as TCP/IP, and are bi-directional so as to not only send messages but also receive sponsor-comments from the editor module 130.

The comment management module 190 reviews the criterion or criteria established by both the publisher and the sponsor, including, for example, a unique article identifier of the particular article (in a given file/channel) that the sponsor has selected, to selectively associate a given sponsor-comment with a particular file, or not associate any sponsor comment at all. In addition, the comment management module 190 reviews any other criterion that is accessible to the comment server(s) 120 to determine whether there is any reason to not publish the comment of a particular sponsor (for instance, because the publisher has already published a maximum allocated number of sponsor-comments on the webpage, and as another example that the sponsor is on a black list of non-allowed sponsors). Assuming that the comment management module determines that the sponsor-comment can be published, the code segment 110 will load from the comment server 120 the sponsor-comment, and the code segment then causes the browser executing at the client machine 102 to include in the display the sponsor-comment together with the publisher-content. The sponsor-comment can contain, for example, up to 500 characters of text or some other limit set by the publisher and stored, for instance, in the configuration file, and, optionally, a link to an external page to assist in sparking a further dialog with the visitor 108. As described below in connection with the flow diagram of FIG. 4, the comment management module, making use of budget parameters input by each sponsor, for example, using the registration module, can also govern how long a sponsor-comment is displayed in a web page, that is, the period of time or the number of times that a web page can be called up with the sponsor-comment included in it.

The editor module 130 is configured to provide the sponsor-comment to the comment management module 190 over the network 140. The editor module can be executed on a number of machines, including the publisher machine 104. Preferably, the editor module is used to prepare or draft the sponsor-comment and add any links to external sites.

Plug-ins can be provided for WordPress, Joomla, Blogger, TypePad and other engines that are configured to permit movement of comments across the network 140.

Depending on the criterion or criteria established by the publisher, the sequence of events can be generally as follows: a publisher creates new content and associates it with a particular file or channel. The comment server 120 monitors and determines that the new content includes keywords related to sponsors in the database 126. For instance, when a new page is published (i.e. new URL), the comment server can know this through the use of tags associated with the comment server. The comment server then scans the new page. A message is constructed and an alert sent to the sponsor, in accordance with defined rules, to inform the sponsor of the content and afford an opportunity to compose a comment. The scanning enables real-time alerting. That comment, composed using the editor module 130, can be presented together with the publisher content with no further action required on the sponsor's part, or the publisher may require manual approval of the comment before permitting the code segment 110 to load it when a visitor requests that channel.

Alternatively or in addition, the comment server can provide a forum for a sponsor to search tagged articles at various URL destinations regardless of the channel or file, and enable the sponsor to add a sponsor-comment without requiring an alert functionality. For example, the comment server can support a network interface (e.g., via a Web server) that provides conventional search and selection functionality so that the sponsor can enter search terms and select the URL of any channel(s) of interest. In this arrangement, the sponsor-comment can again be presented together with the publisher content with no further action required on the sponsor's part, or the publisher may require manual approval of the comment before permitting the code segment 110 to load it when a visitor requests that channel.

As such, it should be appreciated that a sponsor can associate a sponsor-comment with an article in several distinct ways. The sponsor can create a new comment and designate it to a particular URL of a publisher. The sponsor can reuse an existing comment by designating an existing comment with a second or further URL of one or more publishers. The sponsor can edit an existing comment which is then stored in the database 126 so that the edited comment rather than the original one is included in each channel that references that comment the next time a visitor 108 requests the URL.

Referring now to FIGS. 2A through 2E, sponsored comments appear prominently with publisher content, and each sponsor comment is related to a unique file (URL). The sponsor comments can be interspersed within an article, as shown in FIGS. 2A and 2B (210, 220, 230), or can be the first comment immediately following an article or blog-post that a site-visitor has just finished reading, as shown in FIG. 2C (240). Execution of the code segment 110 causes the sponsor-comment to be adjacent to but demarcated from the display of the publisher-content. In FIGS. 2A and 2B, the demarcation comprises an outline 212 and shading 214. In FIG. 2C, the demarcation comprises only shading 214. As can be appreciated from FIGS. 2A and 2C, a visitor 108 having an opinion to share can be follow link 250 to register as a sponsor and create a comment. A demarcation from the remainder of the content can comprise a change in the background, its color, or font, as three non-limiting examples.

Figure 3:
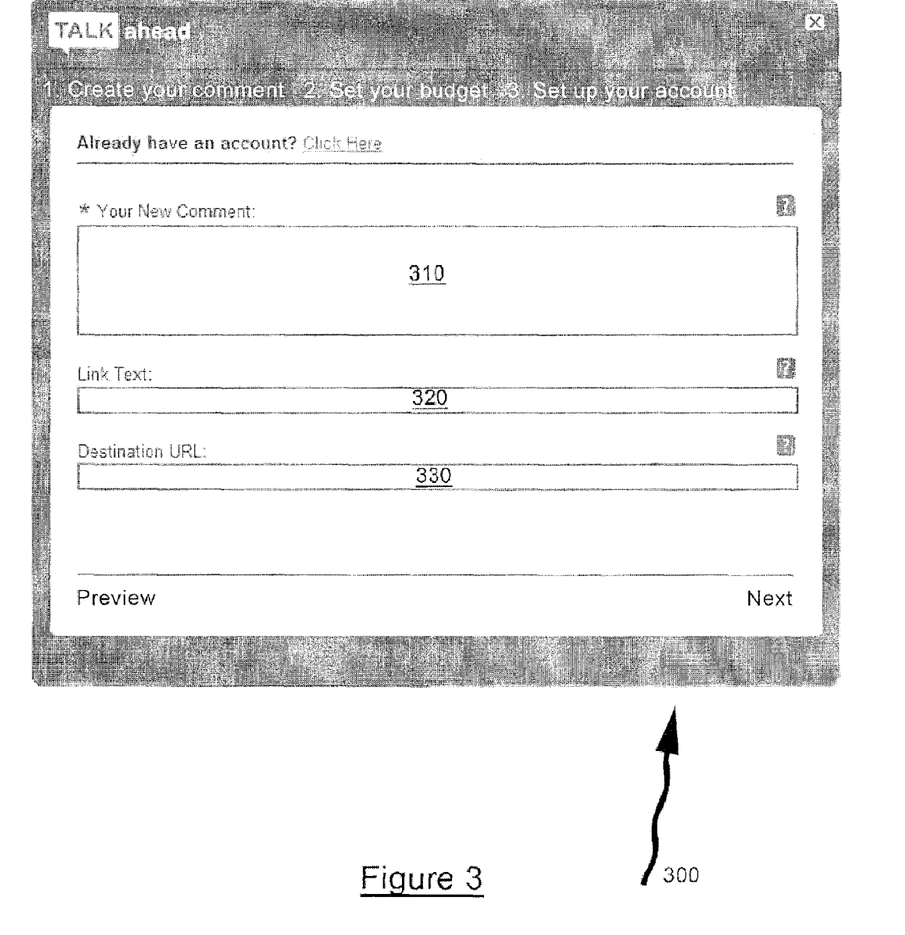
FIG. 3 is a screen display of a form that can be completed electronically and submitted over a network to provide a sponsor-comment for inclusion in one or more web pages that are constructed in accordance with the present invention.

Turning next to FIG. 2D, an exemplary sponsor-comment is shown which is a response of the National Pork Producers Council to an article about the flu virus. The purpose of the comment is to dispel the notion that the "swine flu" is related to pigs and would be a candidate for publishing adjacent to, but demarcated from, any article which uses the term "swine flu." The sponsor has a "learn more" link that is mapped to a destination URL, such as can be entered in the form 300 and also associated with a comment when using the comment editor 130.

FIG. 2E shows a default place-holder when no sponsor-comments satisfy the keyword criteria, the publisher criteria, the sponsor criteria, or a combination of these. The place holder includes the link 250 in the self-serve model that permits the visitor 108 to register as a sponsor and create a comment.

Referring briefly to FIG. 3, a self-service model is illustrated in which anyone with a point of view (and a credit card or other payment source) can purchase a sponsored comment and have it appear prominently with the article or blog post or on some other channel that a publisher has registered with the comment server 120, subject to the policy settings of the content publisher. This self-serve model enables publishers to tap into a pool of advertisers they haven't had the resources to service previously. Form 300 provides text boxes within which the visitor 108 can enter a comment 310, link text from an existing source 320, or identify a third-party site 330. The visitor can preview and submit the comment using button controls provided on the form. In two more steps, the visitor establishes a spending budget for having the comment published, and this can be in accordance with any of the pricing models mentioned herein, and will permit the comment "campaign" to run until the budget is exhausted or the visitor otherwise terminates the campaign. Finally, the account is set up with contact information and billing information in a conventional manner (not shown), and alerts are established through an administrative console using the registration module 150 described above.

Figure 4:
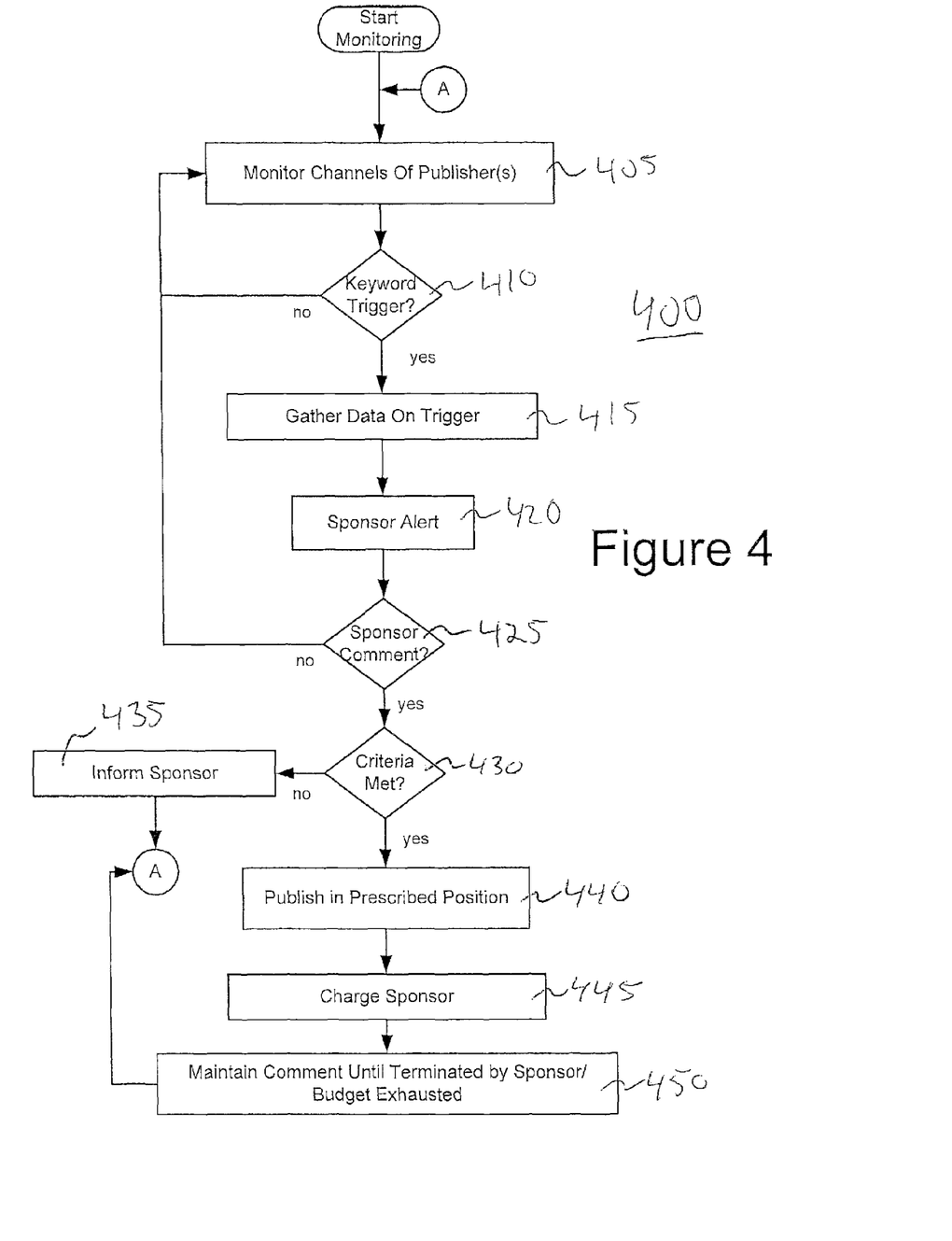
FIG. 4 is a flow diagram illustrating operative blocks arranged to practice a method in accordance with an embodiment on the invention.

With reference now to FIG. 4, a flow diagram 400 illustrates certain steps that are performed in connection with real-time monitoring of publisher content in support of the publication of new sponsor comments. The monitoring method starts at block 405 with the monitoring of publisher channels that result from registration using the registration module 150. In particular, each file that a publisher has registered with the comment server 120 has a URL associated with it. The monitoring step can utilize the keyword alert module 160 to detect changes to the files associated with one or more publisher channels. Alternatively, the monitoring can be triggered by a visitor loading the file in a client machine 102, so that there is no sponsor-comment until at least the first publication of a file (e.g., web page) that includes the code segment 110. The operation of the keyword alert module is described above, but in short it can be configured to parse the text in the files in a publisher channel to identify matches to keywords in the database 126. Block 410 tests whether there is a match, that is, a keyword in the channel that is a keyword chosen by one or more sponsors. If there is no match, monitoring continues as indicated by the loop back to block 405. On the other hand, in the event of such a match, the process flow proceeds to block 415 to gather data on the trigger event. The message construction module 170 can be used to gather the data, including the keyword that matches in the channel being monitored and the database, and also can obtain information such as the destination URL of the publisher content in question or the publisher content itself. At block 420, the sponsor can be alerted of the match, and generally is alerted of the match unless there are rules established by the publisher or the sponsor through use of the registration module that limit the number of alerts. When an alert is to be sent, however, it can be a result of using the communication module 180 to issue a message across the network 140, such as an email, text message, instant message, tweet, or other message medium for action by the sponsor. The alert can include a rating of the value of the article for the sponsor based on projected traffic on the page. This rating can be based on analytics concerning the number of views of the page (which is tagged and therefore can be monitored by the comment server 120 such as at block 405 discussed above), click-throughs of other comments, and so on.

At block 425, the process tests whether a sponsor has responded to the alert with a sponsor-comment, such as may have been created using the editor module 130. If no sponsor-comment is received, the method loops back to step 405. On the other hand, if a sponsor-comment is available, then at block 430 a test is made to determine if the channel that gave rise to the alert (at block 420) accepts the comment as meeting the publisher's criteria for inclusion in that file (e.g., web page). If the criteria are not met, the sponsor is informed at block 435, such as by a conventional message conveyed over the network 140. However, if the criteria have been met, then the sponsor-message is published in a prescribed position, as indicated at block 440. The prescribed position is defined, in part, by the code segment 110, and also can be a function of whether other sponsor-comments have already been accepted (in which case this sponsor-comment may be presented lower as a later comment) or whether other sponsors have agreed to pay more for the publication of their notice (in which case this sponsor-comment again may be presented lower than the higher-paying sponsor). The sponsor is charged for the publication of its comment, as indicated at block 445, and at a later time that fee is shared or the comment server operator is otherwise compensated for providing the publisher with a new sponsored-event. The sponsor-comment remains published until the sponsor has depleted its budget or otherwise terminated the campaign, as indicated at block 450.

Optionally, the comment server 120 can be configured to include safeguards into the platform that prevent marketers from using sponsor-comments to place generic sales messages tied to keywords in articles. For example, the process of placing Sponsor-comments is manual, not automated. Marketers must see the article or blog post, and then decide whether or not to sponsor a comment. While a real-time alert engine, namely, the keyword alert module, notifies marketers whenever a relevant article or blog post is published, the act of posting a sponsor-comment is an individual event. This process encourages the marketer to craft a message that's highly relevant to the article's subject. Such messages have a much higher probability of resonating with the reader, and thereby sparking a dialog.

Institutions can respond to alerts with comments, regardless of whether the online content is negative or not. For instance, an institution may want to comment on a positive article to improve its image.

In summary, therefore, embodiments of the invention are directed to methods, systems, and computer programs stored on computer readable media for delivering comment based information to end users of a data network which includes at least one client system associated with an end user. A portion of web page content relating to a web page intended for display on the client system is received. According to a specific embodiment, the web page corresponds to a URL associated with a content provider. The portion of web page content is analyzed for keyword information. A portion of keyword information associated with the portion of web page content is identified. According to a specific embodiment, the portion of keyword information includes at least one keyword. An institution can be alerted regarding the content of the web page with respect to the at least one keyword is provided to an institution. According to a specific implementation, the institution is able to post a comment related to the content of the web page. The comment is preferably demarcated from the content or other comments. Specifically, the institution is able to post a sponsor-comment. In one embodiment, the sponsor-comment is a paid for comment.

In a further aspect, the comment server 120 can include further processes that are based on interaction of visitors 108 to tagged publisher pages 108. By way of example and not limitation, the server can provide analytics such as reports on the number views of the comments and click-throughs on any links in the comments (including both sponsored comments and visitor comments). Also, the server can send sponsor-comments to a social media network (e.g., Facebook, Twitter, etc.) on an automatic basis and include the comment and a link to a particular article to which the comment has been associated. The server can persist sponsor-comments beyond the expiration of a particular campaign or budget, if desired, by including the comment in a public directory of comments. In addition, further processes that the server 120 can support include two-way conversations between visitors 108 and a sponsor, but permitting visitors to respond to a sponsor-comment with a regular comment. Sponsors can then respond to visitor's non-sponsor comment with another sponsored comment, positioned adjacent to the visitor comment if desired, so as to demonstrate a commitment to the concerned community.

One advantage of the sponsor-comment is that the comment is designated as coming from a reliable source. If the comment is in rebuttal to a news article, the comment coming from a known institution carries more weight than a comment from an anonymous party.

A sponsor, after registering with the comment server 120 identifies one or more keywords for which it wants to be notified. The sponsor (e.g, an institution) pays for the keyword selections, or pays as the keywords occur in content of published channels that it wishes to have comments posted. When one or more of the keywords are present in a given channel, the sponsor is notified. The sponsor can then post a comment on the web page containing the keywords, and the comment is preferably offset one way or another so as to differentiate it from other posts. The institutional post, or sponsored post, is not an anonymous post.

The comment server 120 of FIG. 1 can be configured to selectively publish sponsor-comments on any type of web page (e.g. news pages, blogs, book reviews, product reviews). The comment server provides sponsor-comments to web pages when a visitor requests the page. In the preferred embodiment, the system hosted by the comment server 120 acts as a mediator between the web page owner and the user (i.e., sponsor) who uses the system to add and update sponsor-comments. Further, in a preferred embodiment the system also collects fees from the user/sponsor. The system is configured to monitor and control the process, including, but not limited to, the number of comments per comment per page and calculate the resulting fees.

Sponsor-comments can be placed within publisher-content such as web pages on a cost per message basis. The cost can be based on site content, message content, site traffic; and the like. In one mode, the sponsor-comments are placed at a top of the comment field. In another mode, the sponsor-comments are placed chronologically. In yet another mode, the sponsor-comments are placed at a location based on a bid by the sponsor. Still a further mode enables the sponsor to click select a location for placement of the comment, such as next to a specific reader comment, with the selection being passed back to the comment server 120 with the comment and that information integrating with the channel for placement in accordance with the sponsor's placement selection, and optionally subject to publisher approval of such placement. These modes can be configuration settings selected by a publisher so that the code segment 110 for a given file (channel) can present on a display at the client machine 102 the sponsor-comments in accordance with the publisher's configuration settings. In this way, each publisher or each channel can have its own settings with sponsor-comments arranged in accordance with those settings.

It should be noted that skilled writers, in response to an alert or other notification system, preferably prepare the sponsor-comments. These sponsor-comments therefore have the advantage that they are well thought out and carefully prepared. Optionally, only a limited number of sponsor-comment fields available. This limits the sponsor-comment resource and makes each sponsor-comment more valuable.

The disclosed system provides a cost per message revenue stream for publishers of web site hosts. The proposed system and method are integrated into existing web sited so that the look and feel of the web site does not change. Preferably, the sponsor-comments are clearly marked as such. Additionally, preferably, the site host or owner has editorial review of the sponsor-comments.

The cost per message scheme can be based on one or more of a declining or increasing cost structure base on use, traffic, and the like. Further, the limited sponsor-comments can be acquired via open bidding or fixed fees.

The methods described herein have been described in connection with flow diagrams that facilitate a description of the principal processes; however, certain blocks can be invoked in an arbitrary order, such as when the events drive the program flow such as in an object-oriented program implementation. Accordingly, the flow diagrams are to be understood as example flows such that the blocks can be invoked in a different order than as illustrated.

The modules described herein can be stored within the memory as one or more programs. Each program includes instructions for controlling processor to execute the methods described herein. The program may be implemented as a single module or as a plurality of modules (as described above) that operate in cooperation with one another. The program is contemplated as representing a software embodiment of the method described hereinabove.

It should be understood that the comment server and the other machines described herein include a memory for storing computer-readable data and instructions suitable for controlling the operation of each machine's respective processor(s). An implementation of memory can be, for example, a random access memory (RAM), a hard drive and a read only memory (ROM), or other computer-readable media.

The term "media" includes, for instance, a disk shaped media for such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

While the invention has been described in connection with a certain embodiment thereof, the invention is not limited to the described embodiments but rather is more broadly defined by the recitations in the claims below and equivalents thereof.

We claim:

1. A system connected to a network for publishing a sponsor-comment on a display together with content of a publisher that is associated with a particular file, comprising:
   one or more servers each having a processor;
   a code segment included in each of a plurality of files;
   a database configured to relate a plurality of keywords with one or more sponsors;
   a plurality of modules executing in one or more of the processors and including:
      a registration module operative to register one or more channels of the publisher, each said channel including at least one of the plurality of files;
      a keyword alert module operative to monitor the publisher-content in the registered channels so as to identify a keyword in the files of the registered channels;
      a message construction module configured to respond to the keyword alert module with a message constructed so as to include the identified keyword and at least identify the publisher-content associated with the particular file;

a communication module operative to provide the message to the one or more sponsors and to receive the sponsor-comment across the network; and a comment management module operative to selectively associate the sponsor-comment with the particular file in accordance with at least one criterion accessible to one or more of the servers, wherein the code segment executes, upon opening each respective file using a browser on a client machine, so as to cause the browser to include in the display the sponsor-comment together with the publisher-content.

2. The system of claim 1, further comprising an editor module communicatively coupled to one of the servers and configured to provide the comment management module with the sponsor-comment.

3. The system of claim 2, wherein the sponsor-comment is prepared using the editor module.

4. The system of claim 1, wherein the message construction module includes at least one of a link to the file associated with the publisher-content and the publisher-content itself.

5. The system of claim 4, wherein the message construction module further includes the keyword in the message.

6. The system of claim 1, wherein the keyword alert module executes in one of said processors so as to be operative in real-time.

7. The system of claim 1, wherein the code segment further executes so as to cause the sponsor-comment to be adjacent to but demarcated from the display of the publisher-content.

8. The system of claim 7, wherein the demarcation comprises a border.

9. The system of claim 7, wherein the demarcation comprises highlighting.

10. The system of claim 7, wherein any visitor comments are demarcated from the sponsor-comment.

11. The system of claim 1, wherein the at least one criterion used by the comment management module to selectively associate the sponsor-comment with the particular file comprises an approval provided manually by the publisher.

12. The system of claim 1, further comprising a billing module configured to provide a billing service, wherein the at least one criterion used by the comment management module is a coordination with the billing module in regard to any association of the sponsor-comment with the particular file.

13. The system of claim 1, wherein the one or more sponsors bid on the one or more keywords, wherein the database stores each bid, and wherein the code segment executes so as to cause the browser to include in the display at least one sponsor-comment together with the publisher-content, wherein the at least one sponsor-comment is included in a highest-bid priority manner.

14. The system of claim 1, wherein the sponsor-comment in the particular file is addressable through a network using a uniform resource locator (URL).

15. The system of claim 1, wherein the particular file comprises a web page and wherein the message to the sponsor includes information concerning the projected traffic on the webpage.

16. A system connected to a network for publishing a sponsor-comment on a display together with content of a publisher that is associated with a particular file, comprising:
one or more servers each having a processor;
a code segment included in each of a plurality of files;
a plurality of modules executing in one or more of the processors and including:
a registration module operative to register one or more channels of the publisher, each said channel including at least one of the plurality of files;

a communication module operative to receive a sponsor-comment across the network; and a comment management module operative to selectively associate the sponsor-comment with the particular file in accordance with at least one criterion accessible to one or more of the servers, wherein the code segment executes, upon opening each respective file using a browser on a client machine, so as to cause the browser to include in the display the sponsor-comment together with the publisher-content.

17. The system of claim 16, wherein the code segment further executes so as to cause the sponsor-comment to be adjacent to but demarcated from the display of the publisher-content.

18. The system of claim 16, wherein the at least one criterion used by the comment management module to selectively associate the sponsor-comment with the particular file comprises an approval provided manually by the publisher.

19. The system of claim 1, wherein the channels in which the sponsor-comment can be included are updated in real-time by communication between at least one of the servers with the channels registered with the registration module.

20. The system of claim 16, further comprising:
a database configured to relate a plurality of keywords with one or more sponsors; and
a network interface configured to enable a particular sponsor to search for a particular keyword, present a selection of channels in which the sponsor-comment can be included in response to the search, and obtain the selection of the particular file, wherein the particular file includes the particular keyword.

21. A method for publishing across a network a sponsor-comment together with content of a publisher that is associated with a particular file in a browser of a client machine, comprising:
providing one or more servers each having a processor;
including a code segment in each of a plurality of files;
configuring a database to relate a plurality of keywords with one or more sponsors;
executing a plurality of modules in one or more of the processors, wherein the modules comprise:
a registration module operative to register one or more channels with the publisher, each said channel including at least one of the plurality of files;
a keyword alert module operative to monitor the publisher-content in the registered channels so as to identify a keyword in the files of the registered channels;
a message construction module configured to respond to the keyword alert module with a message constructed so as to include the identified keyword and at least identify the publisher-content associated with the particular file;
a communication module operative to provide the message to the one or more sponsors and to receive the sponsor-comment across the network; and
a comment management module operative to selectively associate the sponsor-comment with the particular file in accordance with at least one criterion accessible to one or more of the servers,
executing the code segment, upon opening each respective file using the browser, and thereby causing the browser to publish the sponsor-comment together with the publisher-content.

* * * * *